Feb. 10, 1931.  K. E. PEILER  1,791,635
METHOD OF AND APPARATUS FOR FEEDING MOLTEN GLASS
Filed June 10, 1926    2 Sheets-Sheet 1
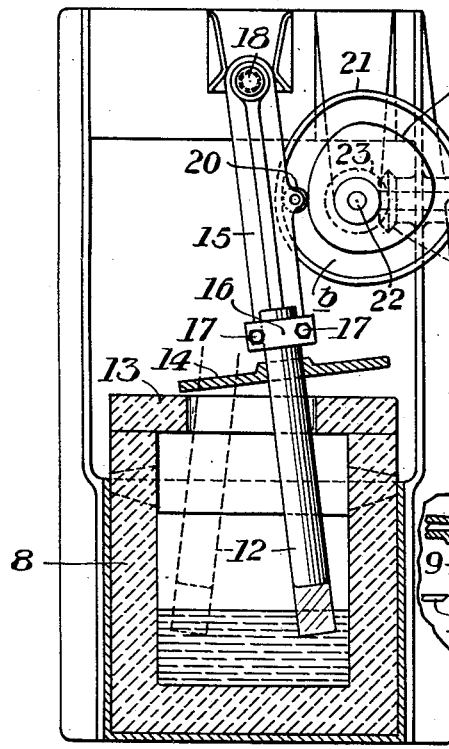
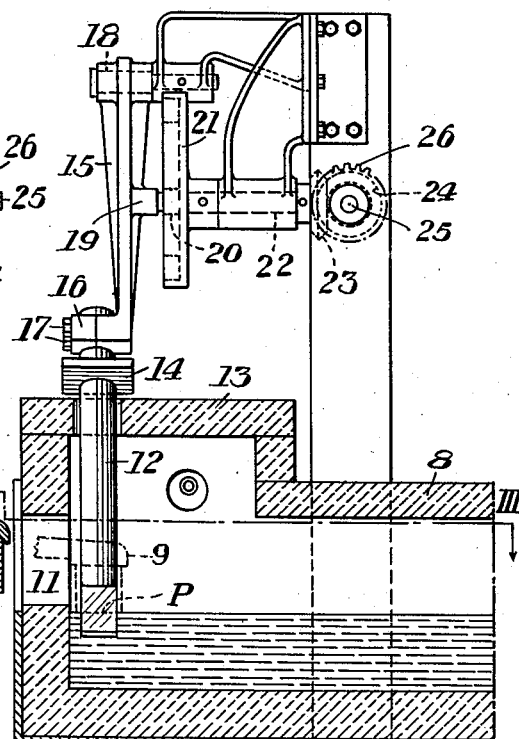
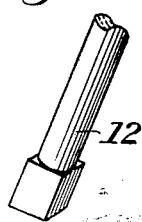
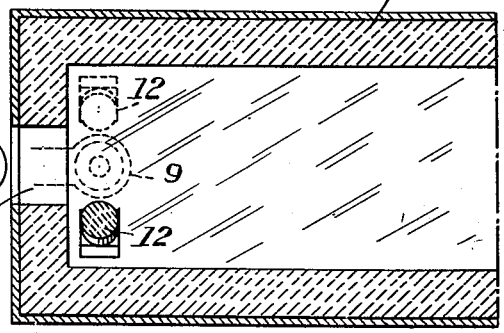
INVENTOR
KARL E. PEILER
By Robson D. Brown
Attorney Feb. 10, 1931.   K. E. PEILER   1,791,635
METHOD OF AND APPARATUS FOR FEEDING MOLTEN GLASS
Filed June 10, 1926   2 Sheets-Sheet 2
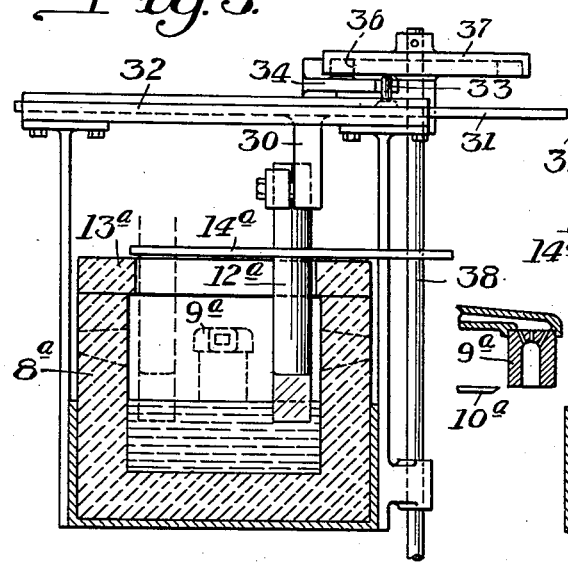
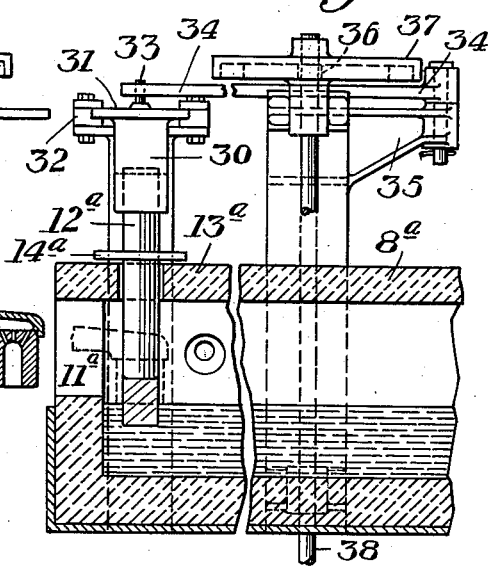
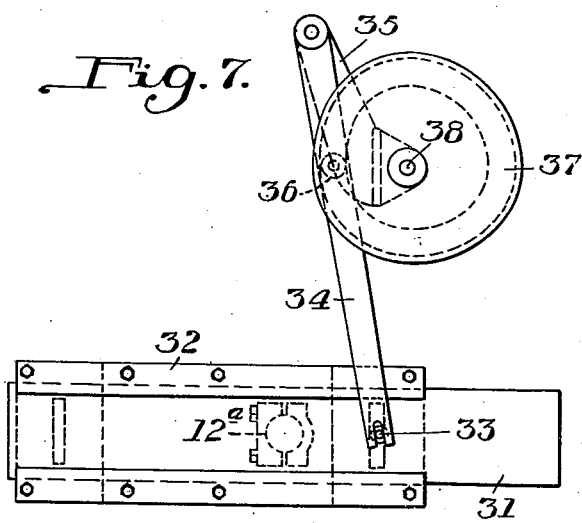
INVENTOR
KARL E. PEILER Patented Feb. 10, 1931

1,791,635

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR FEEDING MOLTEN GLASS

Application filed June 10, 1926. Serial No. 114,882.

My invention relates to a method and apparatus for feeding mold charges of molten glass by gathering from the surface of a body of molten glass contained in a gathering pool or forehearth. It is particularly adapted for use in connection with glass gathering devices employing a gathering receptacle, transfer cup or mold which is filled by suction from the surface of a pool.

When a mold charge of molten glass is gathered from a pool of glass by suction gatherer, or by similar means, the surface of the glass at the gathering station is chilled by contact with the relatively cold gathering means and with such shearing means as are employed to sever the mold charge from the body of glass in the pool. The surface of the glass at the gathering station is also chilled by the exposure caused by the opening which is needed for entrance of the gathering means. These chilled portions of glass would ordinarily be gathered up by the gathering means in gathering subsequent charges, causing defects or blemishes in the charge, which would appear as defects in ware made therefrom. The chill would also interfere with subsequent gathering operations and might even prevent gathering.

My invention has for its object the removal of the chilled surface of glass from the gathering station and the replacing of such chilled glass with hot glass, by causing a circulation or movement of glass, and particularly of the surface glass, past the gathering station, in a gathering pool or forehearth of proper proportion and with proper temperature regulating means. A further object is the reheating of the chilled glass by subjecting it to a suitable environment. Still another object is to provide a suitable gathering pool or forehearth from which mold charges may be gathered. These and other objects will be apparent from the following description.

The present invention is characterized by the use of an implement which clears chilled glass from a gathering station by moving back and forth across the gathering point, thereby positively moving the surface glass at the gathering point. This principle of positively displacing chilled glass from the gathering point may also be employed in the apparatus of my applications for Letters Patent, Serial Nos. 114,881 and 114,883, filed on the same day as the present application, and another related invention is set forth in my application for Letters Patent, Serial No. 114,089 filed on June 7, 1926.

Some of the various means by which the present invention may be practiced are shown in the accompanying drawings, wherein Figure 1 is a transverse vertical sectional view of an installation embodying one form of my invention; Fig. 2 is a longitudinal vertical sectional view of the apparatus of Fig. 1; Fig. 3 is a horizontal sectional view of a portion of the same apparatus, the section being taken on the line III—III of Fig. 2; Fig. 4 is a perspective view showing a portion of the implement of Figs. 1 to 3; Fig. 5 is a trasnverse vertical sectional view of a modified form of apparatus; Fig. 6 is a longitudinal vertical sectional view thereof, and Fig. 7 is a plan view of the operating mechanism of Figs. 5 and 6.

Referring to Figs. 1 to 4, I show a forehearth 8 which contains molten glass from which charges may be segregated by a suction cup gatherer 9 and a shear 10. An opening 11 is provided at the front of the forehearth for admitting the gatherer 9. The suction gatherer and the shear are shown somewhat diagrammatically, since they may be manipulated in any well-known manner, the gatherer being first projected horizontally into the forehearth over the gathering point and then lowered into contact with the glass, after which suction is applied to the cavity of the gatherer to fill it with glass. The gatherer may then be raised and the shearing means operated to sever the glass, after which the gatherer may be withdrawn from the forehearth to a discharging position, where it may discharge its gather or charge of glass into a forming mold.

In order to remove the chilled glass from the gathering point, I provide an implement 12 that extends into the forehearth through a cover 13 and carries a plate 14 that serves to partially close the opening and to prevent radiation of heat from the glass in the forehearth. The implement 12 is adjustably secured to an arm 15 by a clamping plate 16 and screws 17, so that the implement can be conveniently removed from the arm or can be adjusted vertically to regulate the depth to which it extends into the molten glass. The upper end of the arm 15 is pivotally mounted upon a shaft 18 for oscillatory movement transversely of the forehearth. The implement thus swings past the gathering point P and removes the chilled glass to one side, replacing it with hot glass. The implement is swung by a path cam 21 acting through a roller 20 journaled in a bearing 19 on the arm 15. The cam 21 is secured to a shaft 22 to which a bevel gear wheel 23 is also secured. The gear wheel 23 is driven by a bevel gear wheel 24 that is mounted upon a shaft 25 which carries a gear wheel 26 driven from any suitable source of power.

The oscillatory movements of the implements 21, transversely of the forehearth, are indicated in Figs. 1 and 2. The cam 21 is provided with two dwell portions a and b which cause the implement 12 to remain stationary for a definite period of time at each extremity of its path of movement.

The cam drive is synchronized with the motions of the suction gatherer 9 by appropriate means. The suction gatherer may be moved toward and from the gathering point P by a cam or cams and common connection may be provided between such cams and the cam 21. Should the suction gatherer be pneumatically moved, the valves controlling such motion should be synchronized with the motions of the cam 21, either by a common connection or by interposed means.

In this way the gatherer will only be at the gathering point when the implement 12 is at one side and the two can never come into collision. Moreover, in this way the implement is so timed as to move chilled glass caused by the gathering operation immediately after the gathering operation has occurred. In synchronizing the implement with the gathering means, it is preferred that the gathering should take place twice for each complete cycle of motion of the implement. In this way the gatherer gathers a charge when the implement is at one side of the forehearth or pool and then the gatherer moves out of the forehearth. Then the implement moves to the other side of the pool, removing the chilled glass surface. Then the gatherer moves into the forehearth to get another charge and moves out of the forehearth again. Then the implement moves back to the other side of the forehearth to remove the chilled glass ready for another operation of the gatherer. This operation is repeated in regular cycles. If desired, other combinations of motions of implement and of the gatherer may be made, but those just described are preferred.

Referring now to Figs. 5, 6 and 7, I show a modified form of apparatus wherein the implement is reciprocated in a straight line instead of being oscillated in an arcuate path. In this form of device, a forehearth 8a is provided with an opening 11a through which a gatherer 9a and a shear 10a are inserted to remove charges of glass. A displacing implement 12a extends through the forehearth roof 13a and is adjustably clamped to a downwardly extending portion 30 of a carriage 31 that is mounted for sliding movement in a guide 32. A pin 33 extends upwardly from the carriage 31 and is pivotally engaged by the inner end of a lever 34, the outer end of which is pivotally supported by a bracket 35. A roller 36 is journaled in the lever 34 and engages the slot of a path cam 37 that is mounted upon a vertical shaft 38 driven from any suitable source of power.

A plate 14a is carried by the implement 12a and, as the implement moves in a straight line, the plate 14a may be maintained in close proximity to the forehearth roof 13a and prevents escape of heated gases more effectively than in the case of the plate 14 of Fig. 1.

The movements of the cam 37 should be synchronized with the movements of the suction gatherer 9a, as described above with reference to the pivotally swinging implement.

Modifications in the structures herein shown may be made within the scope of the appended claims.

I claim as my invention:

1. The method of feeding molten glass, which comprises periodically withdrawing mold charges from a mass of molten glass and oscillating an implement having a portion continuously immersed in the glass across the point of withdrawal to remove chilled glass therefrom between successive withdrawals of mold charges.

2. The method of circulating molten glass, which comprises causing a body of molten glass to be advanced toward a gathering point, and moving an implement in the glass back and forth in the pool continuously in contact with the glass and in a path extending through said point, and causing said implement to dwell at the end of each of its strokes to permit a gathering operation.

3. Apparatus for feeding molten glass, comprising means for withdrawing glass from one end of a pool, an implement dipping continuously in the glass for moving the surface glass at the withdrawing point, and means for moving said implement back and forth in the pool and in a path extending through the said point of withdrawal, said implement moving means acting to maintain said implement at the ends of its strokes for a substantial period of time to prevent interference with gathering operations at the withdrawing point.

4. Apparatus for feeding molten glass, comprising means for withdrawing glass from one end of a pool, an implement dipping continuously in the glass for moving the surface glass at the withdrawing point, and means for oscillating said implement transversely of the pool and across the said point of withdrawal.

5. The combination with a container for molten glass, from which glass may be withdrawn in a gathering zone adjacent to one end of the container, of an implement dipping continuously in the glass, and means for oscillating said implement transversely of the container, in a path passing through said zone and for causing a substantial dwell of the implement at each end of said path.

6. The combination with a container for molten glass, from which glass may be withdrawn adjacent to one end of the container, of an implement dipping continuously in the glass, and means for oscillating said implement transversely of the container, in a path located adjacent to said end and extending directly across the point of withdrawal of glass, the said means comprising a support for the implement that is mounted for sliding movement in a path disposed transversely of the container.

7. The combination with a container for molten glass, means for periodically withdrawing glass from a supply body in the container, of a vertical implement extending into said container and dipping continuously in the body of glass, a horizontally slidable support for said impeller for moving said impeller back and forth in the glass through the place of withdrawal of the glass, and means for reciprocating said support.

8. The combination with a container for molten glass, of an implement extending downward into said container adjacent to a gathering point, and dipping continuously in the glass, means for pivotally supporting said impeller, and means for oscillating said impeller about its pivot and across said gathering point.

9. The improvement in the glass working art, which comprises mixing the surface glass of a confined supply body of molten glass by moving an implement back and forth in the glass and maintaining the implement temporarily stationary at the end of a stroke thereof, and periodically withdrawing mold charges of glass from the surface of the supply body in the path of movement of the implement in timed relation to the strokes of the implement.

10. The improvement in the glass working art, which comprises mixing the surface glass of a confined supply body of molten glass by moving an implement back and forth in the glass and maintaining the implement temporarily stationary at the end of a stroke thereof, and periodically withdrawing mold charges of glass from the surface of the supply body in the path of movement of the implement between successive strokes and during the intervals of stoppage of movement of the implement.

Signed at Hartford, Conn., this 7th day of June, 1926.

KARL E. PEILER.